United States Patent [19]

Kirchhoff

[11] 4,286,681
[45] Sep. 1, 1981

[54] BOTTOM PLATES FOR WALKING MECHANISMS, CONNECTED BY MEANS OF CONNECTION PIECES

[75] Inventor: Bernhard Kirchhoff, Ennigerloh, Fed. Rep. of Germany

[73] Assignee: O & K Orenstein & Koppel Aktiengesellschaft, Berlin, Fed. Rep. of Germany

[21] Appl. No.: 30,593

[22] Filed: Apr. 16, 1979

[30] Foreign Application Priority Data

Apr. 19, 1978 [DE] Fed. Rep. of Germany ....... 2817046

[51] Int. Cl.³ .......................................... B62D 57/02
[52] U.S. Cl. .................................. 180/8 R; 299/31; 305/1
[58] Field of Search ............. 180/8 R, 8 C, 8 D, 8 E, 180/8 F; 299/31; 267/153, 162; 214/145; 305/1, 3; 280/79.1 R, 79.1 A

[56] References Cited

U.S. PATENT DOCUMENTS

| 647,245 | 4/1900 | Anderson | 180/8 R |
|---|---|---|---|
| 2,918,738 | 12/1959 | Barr | 180/8 R |
| 3,219,362 | 11/1965 | Epstein | 267/153 |
| 3,446,301 | 5/1969 | Thomas | 180/8 C |
| 3,498,488 | 3/1970 | Wildey et al. | 267/16 Z |
| 3,807,519 | 4/1974 | Patch | 180/8 C |

*Primary Examiner*—John J. Love
*Assistant Examiner*—Donn McGiehan
*Attorney, Agent, or Firm*—Martin A. Farber

[57] ABSTRACT

Bottom plates for walking mechanisms for the movement of heavy loads, which bottom plates are connected by means of connection pieces. The bottom plates are elastically connected with connection pieces, the latter being formed as open profiles.

14 Claims, 5 Drawing Figures

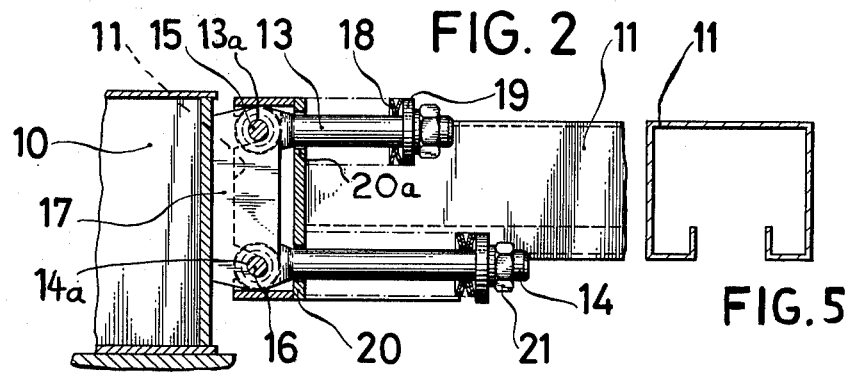
FIG. 2
FIG. 5
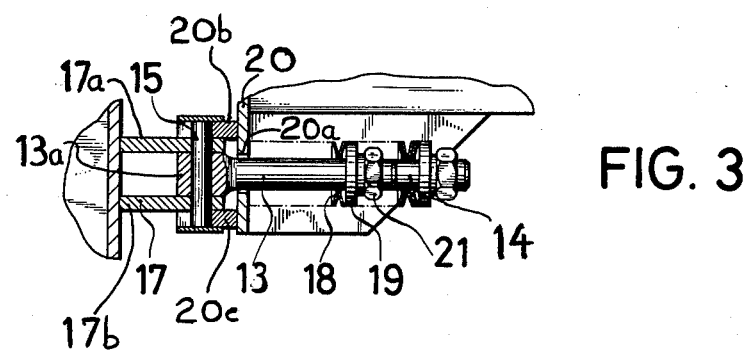
FIG. 3
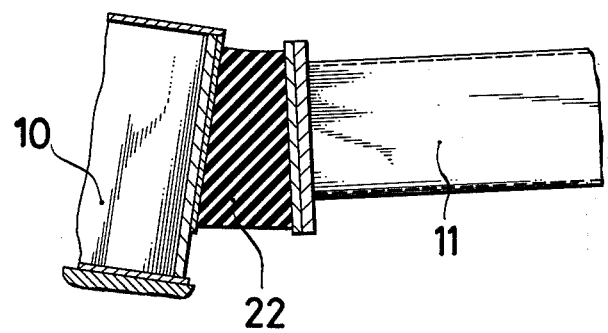
FIG. 4

BOTTOM PLATES FOR WALKING MECHANISMS, CONNECTED BY MEANS OF CONNECTION PIECES

BACKGROUND OF THE INVENTION

Field of the Invention

The invention relates to bottom plates for walking mechanisms for the movement of heavy loads, which bottom plates are connected by means of connection pieces.

With one known arrangement of a bottom plate on a walking mechanism, the members of the multi-membered bottom plate are connected with each other articulated universally by means of a linkage or rods. As a consequence of the articulated connection, the inclined position of the plates which is determined by the ground is maintained during the lifting and thereby the displacement of the bottom plates to another position becomes considerably difficult or impossible.

It is an object of the invention to construct a bottom plate for heavy walking mechanisms such that the individual bottom plates adjust to the unevenness of the terrain, and as soon as they leave the ground they again assume their original position even with an unsymmetrical formation of the bottom plates.

BRIEF SUMMARY OF THE INVENTION

The solution of this task is aided in accordance with another object of the invention in the manner that a closed loop structure is formed with the bottom plates (10) elastically connected with connection pieces (11), the latter being formed as open profiles.

Still further by a feature of the invention the bottom plates (10) are connected with the connection pieces (11) by means of spring washers (18) and bolts (13, 14).

In a development of the invention the connection of the connection pieces (11) with the bottom plates (10), which connection pieces (11) are formed as open profiles, is brought about by means of two bolts (13, 14) which are pivotally arranged in pivot points (15, 16), the latter being superimposed or arranged over one another on the bottom plates (10), a support (20) arranged in the connection pieces (11) and spring washers or cup springs (18) cooperating with the support and the bolts (13, 14).

Still further by another embodiment of the invention the elastic connection between the connection pieces (11) and the bottom plates (10) is brought about by means of rubber pads or blocks (22) which are vulcanized on the connection pieces (11) and on the bottom plates.

With the above and other objects and advantages in view, the present invention will become more clearly understood in connection with the detailed description of preferred embodiments, when considered with the accompanying drawings, of which:

BRIEF DESCRIPTION OF THE DRAWINGS

FIG. 2 is a side view of FIG. 1 partially broken away and in cross-section;

FIG. 3 is a horizontal cross-sectional view of the elastic connection between the bottom plate and the connection piece, partially broken away;

FIG. 4 is a side sectional view of another embodiment of the elastic connection according to the invention; and FIG. 5 is a cross-sectional view of the connection piece of FIG. 2.

DETAILED DESCRIPTION OF THE INVENTION

Figure 1:
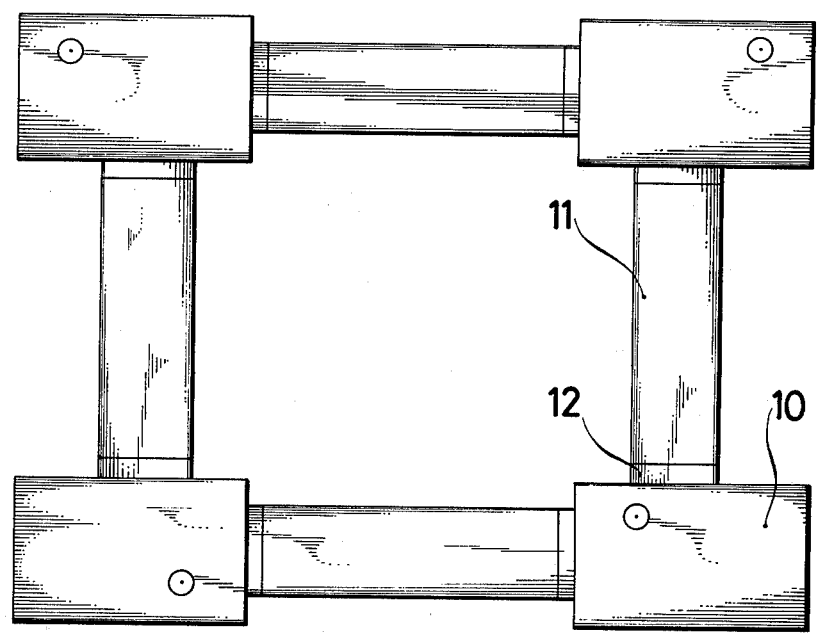
FIG. 1 is a schematic plan view of a walking leg mechanism comprising a plurality of bottom plates.

Referring now to the drawings, and more particularly to FIGS. 1, 2, 3, and 5, bottom plates 10 are connected with connection pieces 11 by an elastic or resilient intermediate member 12. The elastic intermediate member 12 comprises each two threaded bolts 13 and 14 which are articulated in pivot points 15 and 16 of a bearing member 17, the latter being welded onto the bottom plate 10. Spring washers or cup springs 18 are adjustable in their pretension or initial tension by means of a nut 21 (which nut is adjustably threaded on the corresponding bolt) between a disc 19 and a support 20 of the connection piece 11. The support 20 of the connection piece 11 is formed with openings 20a through which the bolts 13 and 14 extend. As illustrated in FIG. 5 the cross-sectional shape of the connection piece 11 is an open U-shaped profile, that is one side is open.

Each pivot point 15, 16, as shown is formed by a pin member extending through aligned pairs of openings in two extensions 17a, 17b of the bearing member 17 as well as through an opening in an enlarged end 13a, 14a, of the bolts 13 and 14, respectively. The support 20 also has two extensions 20b, 20c engaging the pin member in the rest position, FIG. 2, when the bottom plate 10 is not pivoted relative to the connection piece 11 when the bottom plate 10 is pivoted relative to the connection piece 11, the latter moves away from the bolts 15 and 16, respectively, depending on the extent of the pivoting, thereby compressing the springs 18 as the spring support 20 of the connection piece 11 moves toward the respective disc 19.

With the embodiment of FIG. 4 the elastic connection between the bottom plate 10 and the connection piece 11 is produced by means of a rubber pad 22 vulcanized onto the connection piece 11 and the bottom plate 10.

While I have disclosed two embodiments of the invention, it is to be understood that these embodiments are given by example only and not in a limiting sense.

I claim:

1. Bottom plate system for walking mechanisms for the movement of heavy loads, comprising
   connection pieces,
   bottom plates adapted to contact uneven terrain,
   means for elastically connecting said connection pieces with said bottom plates, respectively, such that said bottom plates are elastically connected to each other forming a closed loop structure,
   said connection pieces being formed as profile shaped members having an open side in cross-section so as to be torsionally elastic.

2. The bottom plate system as set forth in claim 1, including
   said means for elastically connecting the bottom plates with the connection pieces include springs and bolts operatively connected to said connection pieces and said bottom plates, respectively.

3. The bottom plate system as set forth in claim 2, wherein
   said springs are spring washers.

4. The bottom plate system for walking mechanisms for the movement of heavy loads as set forth in claim 1, wherein
said means for elastically connecting said connection pieces with said bottom plates comprises:
two bolts pivotally mounted laterally to said bottom plates at pivot points, respectively, the latter being arranged one above the other,
a support arranged on each of said connection pieces,
springs operatively cooperate with said supports and said bolts, respectively.

5. The bottom plate system as set forth in claim 4, wherein said springs are spring washers.

6. The bottom plate system as set forth in claim 5, further comprising
nuts adjustably threaded on said bolts,
said supports are each formed with two openings,
said bolts extend through said openings to said pivot points, respectively,
said spring washers abut said supports adjacent said openings and operatively engage said nuts, respectively.

7. The bottom system as set forth in claim 1, wherein
said means for elastically connecting said connection pieces with said bottom plates comprise rubber blocks vulcanized on said connection pieces and on said bottom plates.

8. The bottom plate system as set forth in claim 1, wherein
said connection pieces form substantially U-shaped elements with the open end of the U facing downwardly.

9. The bottom plate system as set forth in claim 8, wherein
free ends of said U-shaped elements are bent inwardly and upwardly inside sides of said connection pieces.

10. The bottom plate system as set forth in claim 1, wherein
each of said connection pieces is connected at opposite ends thereof to two of said bottom plates.

11. The bottom plate system as set forth in claim 10, wherein
said bottom plates and said connection pieces form a rectangular shaped integral connection with said bottom plates at corners thereof.

12. The bottom plate system as set forth in claim 6, further comprising
two bearing members rigidly connected to each of said bottom plates and formed with two pairs of aligned openings,
pivot pins disposed in each of said pairs of openings,
said bolts have enlarged ends pivotally mounted to said pivot pins respectively and abutting both of said two bearing members,
said pairs of openings, said enlarged ends of said bolts and said pins constitute said pivot points.

13. The bottom plate system as set forth in claim 12, wherein
said bolts each have an unconnected free end,
said nuts are mounted on said bolts at said free ends of said bolts, respectively,
said supports are connected to said connection pieces,
each of said supports is formed with pairs of extensions formed on lateral sides of said openings,
said pivot pins have ends extending beyond said two bearing members,
said pairs of extensions abut said ends of said pivot pins, respectively, in an unpivoted rest position of said connection pieces relative to said bottom plates.

14. The bottom plate system as set forth in claim 13, wherein
one of said bolts is an uppermost bolt, said uppermost bolt is shorter than the other of said bolts, one of said nuts which is disposed on said one of said bolts is closer to the corresponding said support than the other of said nuts.

* * * * *